(12) United States Patent
Yun et al.

(10) Patent No.: US 9,273,753 B2
(45) Date of Patent: Mar. 1, 2016

(54) TORQUE ROD APPARATUS FOR VEHICLE

(71) Applicants: Hyundai Motor Company, Seoul (KR); Kia Motors Corporation, Seoul (KR)

(72) Inventors: Young Dong Yun, Hwaseong-si (KR); Ji Soo Hwang, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/473,833

(22) Filed: Aug. 29, 2014

(65) Prior Publication Data

US 2015/0204414 A1    Jul. 23, 2015

(30) Foreign Application Priority Data

Jan. 22, 2014  (KR) .................. 10-2014-0008000

(51) Int. Cl.
*B60K 5/12* (2006.01)
*F16F 15/08* (2006.01)
*F16F 1/38* (2006.01)

(52) U.S. Cl.
CPC ............... *F16F 15/08* (2013.01); *B60K 5/1241* (2013.01); *F16F 1/3849* (2013.01)

(58) Field of Classification Search
CPC ................................. B60K 5/12; B60K 5/1216
USPC ................................................. 180/54.1–291
See application file for complete search history.

(56) References Cited

U.S. PATENT DOCUMENTS

| | | | | |
|---|---|---|---|---|
| 4,406,344 | A * | 9/1983 | Fukushima | F16F 15/08 180/300 |
| 4,610,420 | A * | 9/1986 | Fukushima | F16F 13/262 180/300 |
| 4,679,759 | A * | 7/1987 | Ford | B60K 5/1216 267/140.13 |
| 6,321,890 | B1 * | 11/2001 | Suzuki | B60K 5/1208 188/379 |
| 6,386,309 | B1 * | 5/2002 | Park | B60K 5/1216 180/291 |
| 8,657,060 | B2 * | 2/2014 | Ohno | B60K 15/063 180/291 |
| 8,876,092 | B2 * | 11/2014 | Wojcieson | H02K 5/24 248/604 |
| 8,876,132 | B2 * | 11/2014 | Marchena | B62D 25/08 180/311 |
| 2012/0200056 | A1 | 8/2012 | Rager et al. | |

FOREIGN PATENT DOCUMENTS

| | | |
|---|---|---|
| JP | 2004-144303 A | 5/2004 |
| JP | 2008-249113 A | 10/2008 |
| KR | 10-2004-0090657 A | 10/2004 |
| KR | 10-2005-0044110 A | 5/2005 |
| KR | 10-2010-0030217 A | 3/2010 |

(Continued)

*Primary Examiner* — John Walters
*Assistant Examiner* — James Triggs
(74) *Attorney, Agent, or Firm* — Morgan, Lewis & Bockius LLP

(57) ABSTRACT

A torque rod apparatus for a vehicle may include a damper supported at an outer circumference thereof by a lower frame of the vehicle, with a first hollow portion being axially formed in the damper, an inner core inserted into the first hollow portion of the damper, with a second hollow portion being axially formed in the inner core, an insert opening formed partially through the damper and the inner core in a radial direction to allow an interior of the inner core and an exterior of the damper to be bored through, and a linkage connected at a first end thereof to a drive unit, with a through hole formed in a second end thereof, the second end being inserted into the insert opening to allow the linkage to be integrally coupled to the lower frame of the vehicle and the inner core.

16 Claims, 4 Drawing Sheets

(56) References Cited

FOREIGN PATENT DOCUMENTS

| KR | 10-2011-0027923 A | 3/2011 |
| KR | 10-2012-0000640 A | 1/2012 |
| KR | 10-2012-0051293 A | 5/2012 |

* cited by examiner

TORQUE ROD APPARATUS FOR VEHICLE

CROSS-REFERENCE(S) TO RELATED APPLICATION

The present application claims priority of Korean Patent Application Number 10-2014-0008000 filed on Jan. 22, 2014, the entire contents of which application is incorporated herein for all purposes by this reference.

BACKGROUND OF THE INVENTION

1. Field of the Invention

The present invention relates to torque rod for vehicles, and, more particularly, to a torque rod for a vehicle, which is configured to reduce the number of components and to simplify a work process.

2. Description of Related Art

A torque rod for a vehicle is a rod that connects a sub-frame provided on a lower portion of the vehicle to an engine or a transmission of the vehicle so as to support the engine or the transmission. In order to prevent resonance from occurring due to the transmission of vibration or noise from the engine to a vehicle body, a damper is generally provided on an end of the torque rod.

As the related art, "torque rods for vehicles" was proposed. This torque rod is configured to include an engine bushing assembly, a vehicle body bushing assembly, a connecting rod, a hinge block, and two guide frames. The engine bushing assembly is coupled to an engine and transmission assembly of a vehicle. A coupling hole is longitudinally formed in a central portion of the vehicle body bushing assembly. The connecting rod connects the engine bushing assembly to the vehicle body bushing assembly. The hinge block is attached to an outer surface of the vehicle body bushing assembly, with a hinge hole formed in a central portion thereof to be parallel to the coupling hole. The two guide frames are located, respectively, on opposite sides of the vehicle body bushing assembly to be coupled with each other via a hinge bolt that passes through the coupling hole and the hinge hole.

However, such a conventional torque rod is problematic in that a plurality of additional components such as the guide frame is required to mount the damper to the vehicle body, and besides, a swaging operation should be performed to enhance the durability of the damper.

In this regard, the swaging operation means an operation that removes residual stress from the damper while a product is expanded and then restored to its original state by a temperature, after the damper is formed. This operation is intended to remove the residual stress from the interior of the damper by applying a compressive force to an exterior of the damper. However, this is problematic in that an additional process of compressing the damper should be performed, thus requiring an additional work process and leading to an increase in cost.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a torque rod for a vehicle, which can be coupled to a vehicle body merely by inserting a rod, connecting the vehicle body to an engine or a transmission, into a damper and then fastening a bolt, and in which the damper can be compressed and supported merely by mounting the damper to the vehicle body, even though no swaging operation is performed.

In an aspect of the present invention, a torque rod apparatus for a vehicle, may include a damper supported at an outer circumference thereof by a lower frame of the vehicle, with a first hollow portion being axially formed in the damper, an inner core inserted into the first hollow portion of the damper, with a second hollow portion being axially formed in the inner core, an insert opening formed partially through the damper and the inner core in a radial direction to allow an interior of the inner core and an exterior of the damper to be bored through, and a linkage connected at a first end thereof to a drive unit, with a through hole formed in a second end thereof, the second end being inserted into the insert opening to allow the linkage to be integrally coupled to the lower frame of the vehicle and the inner core.

The damper may include an upper damper and a lower damper that are independently provided to be separate from each other, the upper and lower dampers being located to be spaced apart from each other by a predetermined interval.

Facing portions of the upper and lower dampers extend towards each other to be coupled in a single structure.

The second end of the linkage is inserted to a position of a connected portion of the upper and lower dampers, which faces the second end of the linkage, thus defining a guide groove that allows the through hole to be aligned with the second hollow portion of the inner core.

A plurality of recesses is formed on an outer circumference of the inner core, and a plurality of protrusions is formed on an inner circumference of the damper to engage with the recesses.

The insert opening may have a shape of a hole and is located in an axially central portion of the inner core.

The insert opening is formed to allow the second end of the linkage to pass through the inner core.

The insert opening is formed only in an insert-side direction of the linkage to prevent the second end of the linkage, inserted into the hollow portion of the inner core, from passing therethrough.

An outer race is provided between the damper and the lower frame of the vehicle to surround the damper.

An upper outer race and a lower outer race are provided, respectively, on an outer circumference of the upper damper and an outer circumference of the lower damper to surround the respective outer circumferences of the upper and lower dampers.

A support casing is provided on the lower frame in such a way that an inner circumference of the support casing is formed according to a shape of the outer circumferences of the upper and lower dampers, so that the upper and lower dampers and the upper and lower outer races are press fitted therein, and, when the upper and lower dampers are press fitted into the support casing, the upper and lower dampers are compressed against each other, and a compressive force is generated on each of the upper and lower dampers in a radial direction thereof.

The inner core may have a shape of a cylinder in which the insert opening is formed, and the damper may have a doughnut shape such that an inner circumference thereof comes into contact with an outer circumference of the inner core.

The inner core and the linkage are integrally coupled to each other via a bolt passing through the through hole and the second hollow portion of the inner core.

The inner core may include an upper inner core and a lower inner core, the upper and lower inner cores being independently separated from each other to define a space therebetween, thus forming the insert opening.

A bolt is provided to pass through the through hole and the second hollow portion of the inner core and thereby integrally couple them with each other.

The lower inner core is coupled with the bolt in a single structure and the upper inner core is selectively coupled to the bolt.

As is apparent from the above description, the torque rod for the vehicle is advantageous in that the fastening operation is completed merely by tightening the bolt after the insertion of the linkage, because the damper is integrally connected to one inner core, thus simplifying the work process and reducing the number of components used in the torque rod.

Further, the torque rod for the vehicle is advantageous in that the damper is compressed and supported simply by mounting the damper to the vehicle body, so that it is unnecessary to perform an additional swaging operation and thereby it is possible to achieve a reduction in cost because of the omission of the swaging operation.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
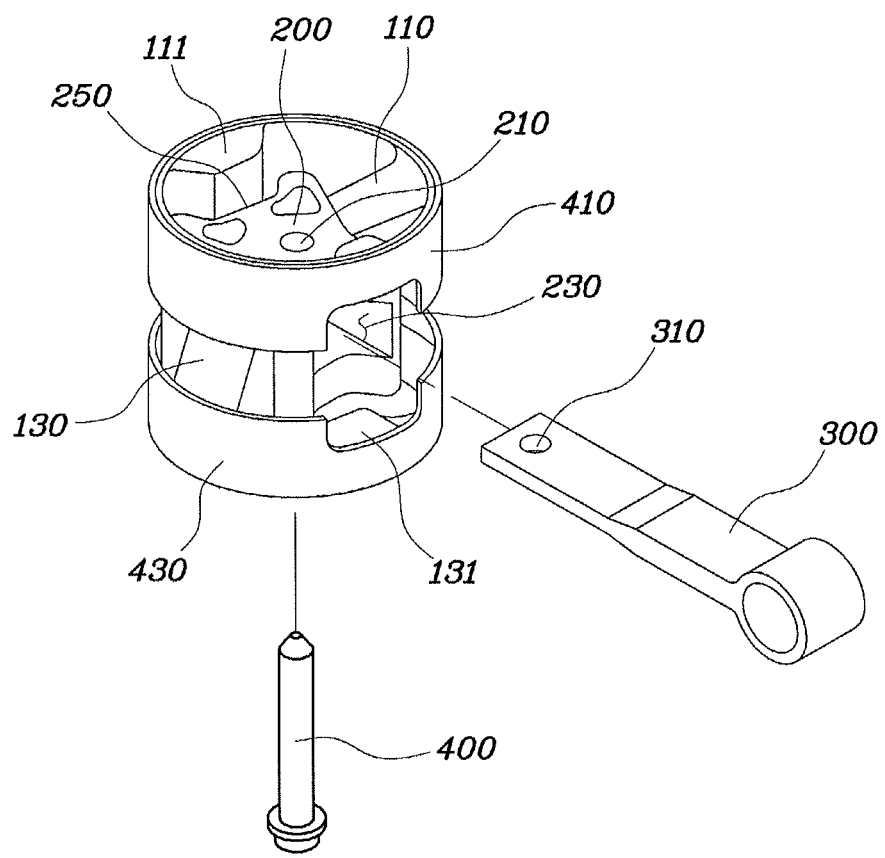
FIG. 1 is a view showing the assembly of a torque rod for a vehicle according to a various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, a torque rod for a vehicle according to the preferred embodiment of the present invention will be described with reference to the accompanying drawings.

Figure 2:
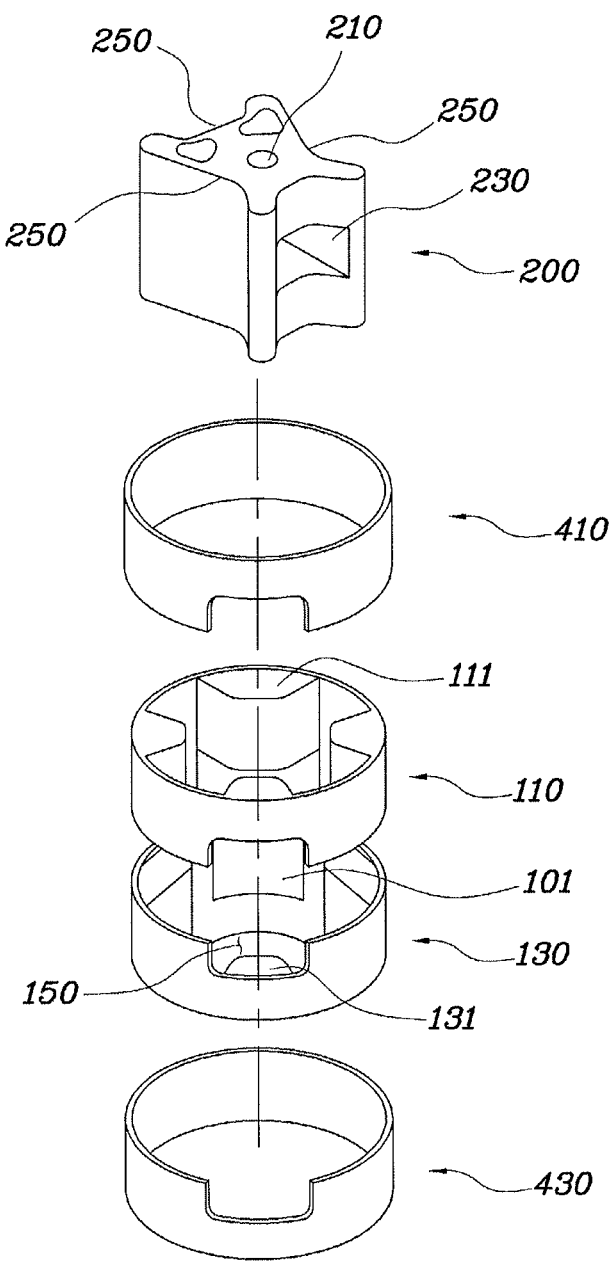
FIG. 2 is an exploded view showing the torque rod for the vehicle according to the various exemplary embodiments of the present invention.
Figure 3:
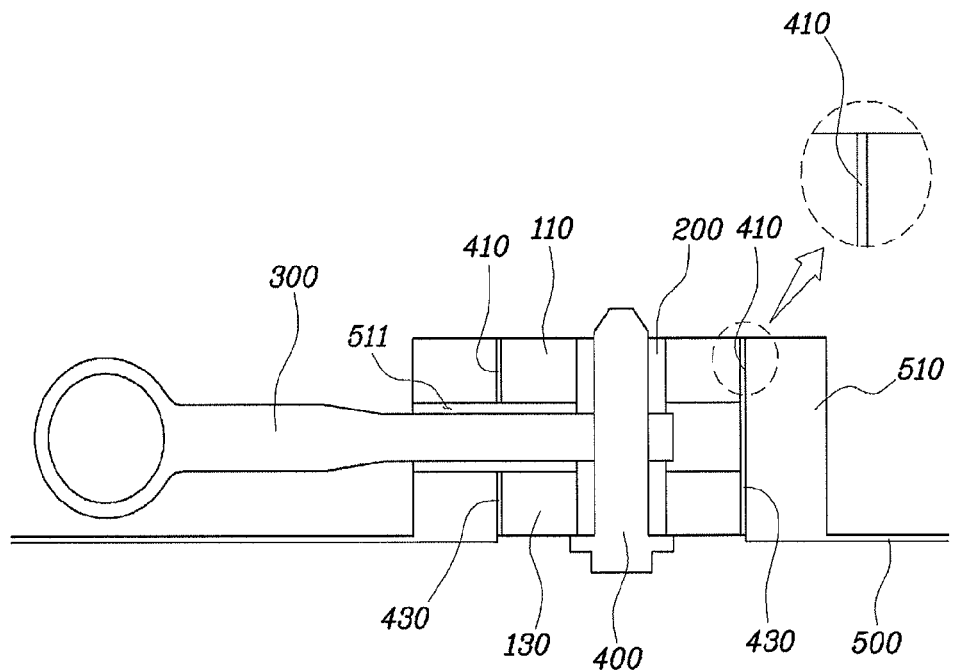
FIG. 3 is a sectional view showing the torque rod for the vehicle according to the various exemplary embodiments of the present invention.

FIG. 1 is an exploded view showing a torque rod for a vehicle according to a first embodiment of the present invention, FIG. 2 is an exploded view showing the torque rod for the vehicle according to the first embodiment of the present invention, and FIG. 3 is a sectional view showing the torque rod for the vehicle according to the first embodiment of the present invention. The torque rod for the vehicle according to the first embodiment of the present invention includes a damper 110, 130 which is supported at an outer circumference thereof by a lower frame 500 of the vehicle, with a hollow portion being axially formed in the damper, an inner core 200 which is inserted into the hollow portion 150 of the damper 110, 130, with a hollow portion being axially formed in the inner core, an insert opening 230 which is formed partially through the damper 110, 130 and the inner core 200 in a radial direction to allow an interior of the inner core 200 and an exterior of the damper 110, 130 to be bored through, and a linkage 300 which is connected at a first end thereof to a drive unit, with a through hole 310 formed in a second end thereof, the second end being inserted into the insert opening 230 to allow the linkage 300 to be integrally coupled to the lower frame 500 of the vehicle and the inner core 200.

The damper 110, 130 is mounted to the lower frame 500. To be more specific, it is preferable that the damper be mounted to a sub-frame provided on a lower portion of the vehicle. The damper 110, 130 and the linkage 300 are coupled to each other to support the drive unit, for example, an engine or a transmission.

The damper 110, 130 is mounted to the lower frame 500 in such a way that the hollow portion 150 of the damper 110, 130 faces towards upper and lower positions of the vehicle. A support casing 510 is provided on the lower frame 500 in such a way that an inner circumference of the support casing 510 is formed according to a shape of the outer circumference of the damper 110, 130 so that the damper 110, 130 is press fitted therein. The support casing 510 is integrated into the lower frame 500 in a single structure. The support casing 510 may extend upwards or downwards with respect to the lower frame 500 in such a way as to protrude therefrom. Alternatively, a mounting hole may be formed vertically through the lower frame 500, so that the damper 110, 130 may be press fitted into the mounting hole.

Preferably, a bolt 400 is provided to pass through the inner core 200 and the through hole 310 of the linkage 300, thus allowing all of the inner core 200, the damper 110, 130, and the linkage 300 to be integrally coupled to each other.

As the circumference of the damper 110, 130 is pressurized while the inner core 200, the damper 110, 130, and the linkage 300 are press fitted into the support casing 510, they are preferably secured to the support casing 510. That is, they are not coupled to the lower frame 500 via the bolt 400 but are secured to the lower frame 500 in a pressurizing manner through press fitting. To this end, a diameter of the damper 110, 130 may be formed larger than that of the support casing 510.

Preferably, a hole 511 is formed through the support casing 510 so that the linkage 300 is inserted into the support casing 510. The hole 511 is preferably located to be aligned with the insert opening 230.

As the damper 110, 130 is secured to the support casing 510 in the simple press fitting manner, vibration is not transmitted via the bolt 400 but is transmitted only via the damper 110, 130, thus achieving a effective reduction in vibration.

The damper 110, 130 includes an upper damper 110 and a lower damper 130 that are independently provided to be separate from each other. The upper and lower dampers 110 and 130 are preferably located to be spaced apart from each other by a predetermined interval. The predetermined interval is preferably set to permit the insertion of the linkage 300. Preferably, the upper and lower dampers 110 and 130 are partially connected to each other, thus forming a single structure. That is, the facing circumferences of the upper and lower dampers 110 and 130 extend partially or wholly towards each other to be coupled to each other, so that the upper and lower dampers 110 and 130 form the single structure. In this regard, the extending portions may be formed at predetermined intervals along the circumference of each of the upper and lower dampers 110 and 130, or be formed continuously to be connected to the circumference of each of the upper and lower dampers 110 and 130.

Here, the forming in the single structure means that components are integrated into a single structure through casting or the like.

As the upper damper 110 is connected to the lower damper 130, the damper 110, 130 can be press fitted into the support casing 510 only with a single inserting operation, thus simplifying a work process. Simultaneously, as the damper 110, 130 includes the upper and lower dampers 110 and 130 that are spaced apart from each other by a predetermined interval, the interval allows the damper 110, 130 to be moved more elastically, so that the ability to absorb vibration and noise can be improved.

The second end of the linkage 300 is inserted to a position facing the second end of the linkage 300 on an extended and connected portion of second ends of the upper and lower dampers 110 and 130, thus forming a guide groove 101 that allows the through hole 310 to be aligned with the hollow portion 210 of the inner core 200. That is, the guide groove 101 serves to support the second end of the linkage 300 protruding through the inner core 200, thus preventing the linkage 300 from moving any more in an inserting direction and stopping the linkage 300 at a position where the through hole 310 is aligned with the hollow portion 210 of the inner core 200. Therefore, the guide groove 101 is preferably provided in the inserting direction of the linkage 300.

The guide groove 101 offers an advantage in that this makes it unnecessary to perform an additional operation of aligning the through hole 310 with the hollow portion 210 of the inner core 200, when the linkage 300 is inserted, and it has only to fasten the bolt 400 immediately after the insertion of the linkage 300, thus enhancing work efficiency.

Preferably, a plurality of recesses 250 is formed on an outer circumference of the inner core 200, and a plurality of protrusions 111, 131 is formed on an inner circumference of the damper 110, 130 to engage with the recesses 250. Such a configuration prevents the inner core 200 from rotating relative to the damper 110, 130, and increases a coupling force of the damper 110, 130 with the inner core 200, thus enabling stable support. Further, a space between the protrusions 111, 131 allows each protrusion 111, 131 to move elastically, thus enhancing the ability to absorb vibration. Here, various shapes and numbers are possible as the exemplary embodiment of the recess 250.

Figure 4:
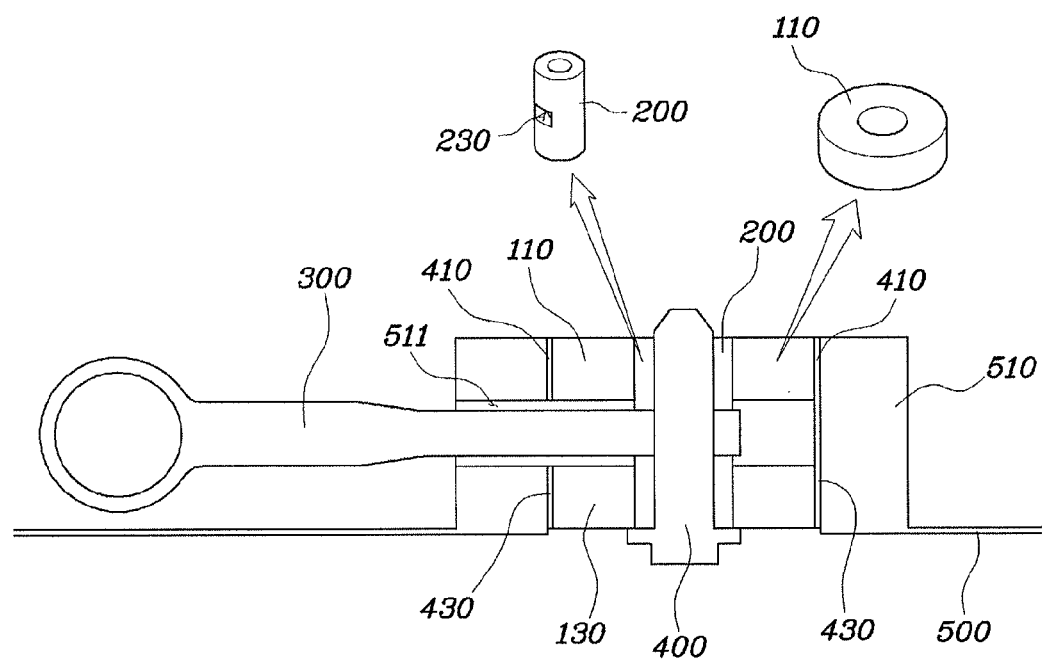
FIG. 4 is a view showing another shape of an inner core and a damper included in the torque rod for the vehicle according to the various exemplary embodiments of the present invention.

As shown in FIG. 4, the outer circumference of the inner core 200 may have no groove 250 but may have a cylindrical shape. The damper 110, 130 may be formed in a doughnut shape such that the inner circumference of the damper 110, 130 matches with the shape of the outer circumference of the inner core 200 and comes into contact with the outer circumference of the inner core 200. Here, the upper and lower dampers 110 and 130 may be independently provided without being connected to each other, or may be integrally connected to each other as described above. FIG. 4 is a view showing another shape of the inner core and the damper included in the torque rod for the vehicle according to the first embodiment of the present invention.

Preferably, the inner core 200 is formed in the same length as the damper 110, 130. The insert opening 230 is preferably located in a central portion in the longitudinal direction of the inner core 200.

Such a configuration allows vibration to be evenly transmitted through the linkage 300 to the upper and lower dampers 110 and 130, thus achieving a reduction in vibration.

Preferably, the insert opening 230 may be a hole to allow the second end of the linkage 300 to pass through the inner core 200.

Thereby, the second end of the linkage 300 may pass through the inner core 200 to be positioned in the guide groove 101 of the damper 110, 130, and the through hole 230 may be positioned to be aligned with the hollow portion 210 of the inner core 200.

However, the insert opening 230 may be formed only in the inserting direction to prevent the second end of the linkage 300, inserted into the hollow portion 210 of the inner core 200, from passing therethrough. In this case, the guide groove 101 is not formed between the upper and lower dampers 110 and 130, but is formed at a position on the inner circumference of the inner core 200 facing the insert opening 230, thus guiding the position of the linkage 300.

As shown in FIG. 2, an outer race 410, 430 is preferably provided between the damper 110, 130 and the support casing 510 to surround the damper 110, 130.

In detail, the upper outer race 410 and the lower outer race 430 are provided on the outer circumference of the upper damper 110 and the outer circumference of the lower damper 130 to surround the respective outer circumferences.

Preferably, the outer race 410, 430 includes a ring-shaped panel to contact and surround the outer circumference of the damper 110, 130. Preferably, the damper 110, 130 is press fitted into the support casing 510 together with the outer race 410, 430.

When the upper and lower dampers 110 and 130 are integrated into a single structure, the upper and lower outer races 410 and 430 preferably extend towards each other to be integrated into a single structure. In contrast, when the upper and lower dampers 110 and 130 are independently provided, it is preferable that the upper and lower outer races 410 and 430 be also independently provided.

When the damper 110, 130 is inserted into the support casing 510 by press fitting, the outer race 410, 430 vertically compresses the damper 110, 130 and produces the compressive force on the damper 110, 130 in the radial direction. The outer race 410, 430 suppresses outward deformation when the damper 110, 130 is compressed vertically, and the inner core 200 suppresses inward deformation, thus causing vertical and radial compressive force to be generated on the damper 110, 130.

To be more specific, while a product is expanded and then restored by a temperature after the damper 110, 130 is formed, residual stress is produced on the damper 110, 130. This lowers the durability of the damper 110, 130. However, when the outer race 410, 430 is installed and press fitted into the support casing 510, the outer race 410, 430 pressurizes the outer circumference of the damper 110, 130, thus removing the residual stress from the damper 110, 130 and enhancing the durability of the damper 110, 130.

Since the swaging effect can be obtained simply by press fitting, it is unnecessary to perform an additional swaging operation, thus simplifying the work process and achieving a reduction in cost.

Further, the outer circumference of the outer race 410, 430 is in frictional contact with the inner circumference of the support casing 510, thus preventing the damper 110, 130 and the inner core 200 from being removed from the support casing 510.

When the upper and lower outer races 410 and 430 extend towards each other to be integrated into a single structure, a central portion of the connected portion is preferably bent to enable the compression of the damper 110, 130.

Figure 5:
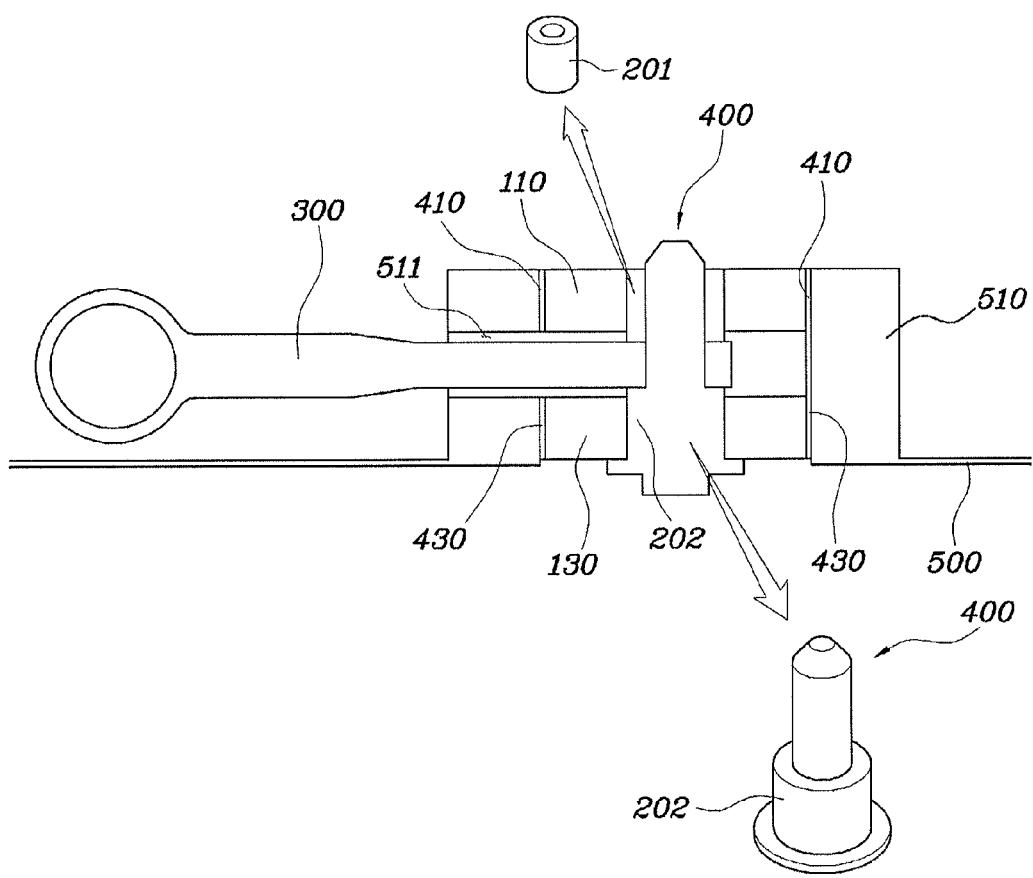
FIG. 5 is a view showing the configuration of a torque rod for a vehicle according to a various exemplary embodiments of the present invention.

Now, another embodiment of the present invention will be described. FIG. 5 is a view showing the configuration of a torque rod for a vehicle according to a second embodiment of the present invention. The torque rod for the vehicle according to the second embodiment of the present invention is configured so that the inner core 201, 202 includes an upper inner core 201 and a lower inner core 202. The upper inner core 201 and the lower inner core 202 are independently separated from each other, thus defining a space therebetween and thereby forming the insert opening 230, and the linkage 300 is inserted into the space, so that they are integrally coupled to each other via the bolt 400.

In an exemplary embodiment of the present invention, the lower inner core 202 is integrated with the bolt 400 through welding or casting, so that the lower inner core 202 can be inserted into the hollow portion 150 of the damper 110, 130 merely by fastening the bolt 400. That is, since an operation of inserting the inner core 201, 202 into the hollow portion 150 of the damper 110, 130 can be performed only once, the work process can be simplified at the time of being installed.

The upper and lower inner cores 201 and 202 may have various shapes.

The remaining configuration of the second embodiment may be the same as the first embodiment.

As described above, the present invention provides a torque rod for a vehicle, in which a damper is integrally connected to one inner core, so that a fastening operation is completed merely by tightening a bolt after the insertion of a linkage, thus simplifying a work process and reducing the number of components used in the torque rod.

Further, the present invention provides a torque rod for a vehicle, in which a damper is compressed and supported simply by mounting the damper to a vehicle body, so that it is unnecessary to perform an additional swaging operation and thereby it is possible to achieve a reduction in cost because of the omission of the swaging operation.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A torque rod apparatus for a vehicle, comprising:
a damper supported at an outer circumference thereof by a lower frame of the vehicle, with a first hollow portion being axially formed in the damper;
an inner core inserted into the first hollow portion of the damper, with a second hollow portion being axially formed in the inner core;
an insert opening formed partially through the damper and the inner core in a radial direction to allow an interior of the inner core and an exterior of the damper to be bored through; and
a linkage connected at a first end thereof to a drive unit, with a through hole formed in a second end thereof, the second end being inserted into the insert opening to allow the linkage to be integrally coupled to the lower frame of the vehicle and the inner core.

2. The torque rod apparatus as set forth in claim 1, wherein the damper comprises an upper damper and a lower damper that are independently provided to be separate from each other, the upper and lower dampers being located to be spaced apart from each other by a predetermined interval.

3. The torque rod apparatus as set forth in claim 2, wherein facing portions of the upper and lower dampers extend towards each other to be coupled in a single structure.

4. The torque rod apparatus as set forth in claim 3, wherein the second end of the linkage is inserted to a position of a connected portion of the upper and lower dampers, which faces the second end of the linkage, thus defining a guide groove that allows the through hole to be aligned with the second hollow portion of the inner core.

5. The torque rod apparatus as set forth in claim 1, wherein a plurality of recesses is formed on an outer circumference of the inner core, and a plurality of protrusions is formed on an inner circumference of the damper to engage with the recesses.

6. The torque rod apparatus as set forth in claim 1, wherein the insert opening has a shape of a hole and is located in an axially central portion of the inner core.

7. The torque rod apparatus as set forth in claim 1, wherein the insert opening is formed to allow the second end of the linkage to pass through the inner core.

8. The torque rod apparatus as set forth in claim 1, wherein the insert opening is formed only in an insert-side direction of the linkage to prevent the second end of the linkage, inserted into the hollow portion of the inner core, from passing therethrough.

9. The torque rod apparatus as set forth in claim 2, wherein an outer race is provided between the damper and the lower frame of the vehicle to surround the damper.

10. The torque rod apparatus as set forth in claim 9, wherein an upper outer race and a lower outer race are provided, respectively, on an outer circumference of the upper damper and an outer circumference of the lower damper to surround the respective outer circumferences of the upper and lower dampers.

11. The torque rod apparatus as set forth in claim 10, wherein a support casing is provided on the lower frame in such a way that an inner circumference of the support casing is formed according to a shape of the outer circumferences of the upper and lower dampers, so that the upper and lower dampers and the upper and lower outer races are press fitted therein, and, when the upper and lower dampers are press fitted into the support casing, the upper and lower dampers are compressed against each other, and a compressive force is generated on each of the upper and lower dampers in a radial direction thereof.

12. The torque rod apparatus as set forth in claim 1, wherein the inner core has a shape of a cylinder in which the insert opening is formed, and the damper has a doughnut shape such that an inner circumference thereof comes into contact with an outer circumference of the inner core.

13. The torque rod apparatus as set forth in claim 1, wherein the inner core and the linkage are integrally coupled to each other via a bolt passing through the through hole and the second hollow portion of the inner core.

14. The torque rod apparatus as set forth in claim 1, wherein the inner core comprises an upper inner core and a lower inner core, the upper and lower inner cores being independently separated from each other to define a space therebetween, thus forming the insert opening.

15. The torque rod apparatus as set forth in claim 14, wherein a bolt is provided to pass through the through hole and the second hollow portion of the inner core and thereby integrally couple them with each other.

16. The torque rod apparatus as set forth in claim 15, wherein the lower inner core is coupled with the bolt in a single structure and the upper inner core is selectively coupled to the bolt.

* * * * *